(12) United States Patent
Inoue et al.

(10) Patent No.: US 11,591,412 B2
(45) Date of Patent: *Feb. 28, 2023

(54) CARBOXYMETHYLATED CELLULOSE NANOFIBERS

(71) Applicant: NIPPON PAPER INDUSTRIES CO., LTD., Tokyo (JP)

(72) Inventors: Kazuhiko Inoue, Tokyo (JP); Takeshi Nakatani, Tokyo (JP); Yusuke Tada, Tokyo (JP); Takeshi Fujii, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 58 days.

This patent is subject to a terminal disclaimer.

(21) Appl. No.: 16/770,559

(22) PCT Filed: Dec. 5, 2018

(86) PCT No.: PCT/JP2018/044702
§ 371 (c)(1),
(2) Date: Jun. 5, 2020

(87) PCT Pub. No.: WO2019/111941
PCT Pub. Date: Jun. 13, 2019

(65) Prior Publication Data
US 2021/0163629 A1    Jun. 3, 2021

(30) Foreign Application Priority Data

Dec. 7, 2017  (JP) ............................. JP2017-235016
Jan. 19, 2018  (JP) ............................. JP2018-007508
Feb. 21, 2018  (JP) ............................. JP2018-028561
Apr. 12, 2018  (JP) ............................. JP2018-076540

(51) Int. Cl.
*C08B 11/12*    (2006.01)
*B82Y 30/00*    (2011.01)
*B82Y 40/00*    (2011.01)

(52) U.S. Cl.
CPC ............. *C08B 11/12* (2013.01); *B82Y 30/00* (2013.01); *B82Y 40/00* (2013.01)

(58) Field of Classification Search
CPC .................................................... C08B 11/12
See application file for complete search history.

(56) References Cited

U.S. PATENT DOCUMENTS

| | | | |
|---|---|---|---|
| 4,270,914 A | 6/1981 | Dahl | |
| 4,491,661 A | 1/1985 | Bredereck et al. | |
| 4,579,943 A | 4/1986 | Kamide et al. | |
| 5,722,433 A | 3/1998 | Ishino et al. | |
| 11,092,587 B2 | 8/2021 | Nakatani et al. | |
| 2006/0014721 A1 | 1/2006 | Zhang et al. | |
| 2009/0233509 A1 | 9/2009 | Bellini et al. | |
| 2016/0333116 A1 | 11/2016 | Nakatani et al. | |
| 2019/0055323 A1 | 2/2019 | Kakubari et al. | |
| 2019/0116858 A1 | 4/2019 | Kawasaki et al. | |
| 2019/0330767 A1* | 10/2019 | Takaichi | ............. C08L 1/286 |
| 2020/0369787 A1 | 11/2020 | Inoue et al. | |
| 2021/0180214 A1 | 6/2021 | Inoue et al. | |
| 2021/0214465 A1 | 7/2021 | Inoue et al. | |
| 2021/0214466 A1 | 7/2021 | Inoue et al. | |

FOREIGN PATENT DOCUMENTS

| | | |
|---|---|---|
| EP | 1920787 A2 | 5/2008 |
| JP | S27-1944 B1 | 5/1952 |
| JP | S33-05645 B1 | 7/1958 |
| JP | H01-044201 B2 | 9/1989 |
| JP | H09-176201 A | 7/1997 |
| JP | H10-251301 A | 9/1998 |
| JP | 2002-194001 A | 7/2002 |
| JP | 2007-191558 A | 8/2007 |
| JP | 2008-1728 A | 1/2008 |
| JP | 2008-222859 A | 9/2008 |
| JP | 2012-012553 A | 1/2012 |
| JP | 2013-185122 A | 9/2013 |
| JP | 2015-149929 A | 8/2015 |
| JP | 2017-149901 A | 8/2017 |
| JP | 6228707 B1 | 11/2017 |
| JP | 6337225 B1 | 6/2018 |
| JP | 6351821 B1 | 7/2018 |
| JP | 6417490 B1 | 11/2018 |
| JP | 6442106 B1 | 12/2018 |
| WO | 2014/087767 A1 | 6/2014 |
| WO | 2014/088072 A1 | 6/2014 |
| WO | 2017/111016 A1 | 6/2017 |
| WO | 2017/199924 A1 | 11/2017 |
| WO | 2019/111928 A1 | 6/2019 |

(Continued)

OTHER PUBLICATIONS

International Search Report and Written Opinion for Application No. PCT/JP2018/044702, dated Feb. 12, 2019, 8 pages.
International Search Report and Written Opinion for Application No. PCT/JP2018/044697, dated Jan. 12, 2019, 8 pages.
International Search Report and Written Opinion for Application No. PCT/JP2018/044690, dated Mar. 5, 2019, 6 pages.
International Search Report and Written Opinion for Application No. PCT/JP2018/044686, dated Jan. 29, 2019, 4 pages.
International Search Report and Written Opinion for Application No. PCT/JP2018/044677, dated Jan. 29, 2019, 7 pages.
Wang et al., Preparation of Nanocellulose from Corn Cob Ethanol Bioresidue and its Effects on Paper Properties. Journal of Tianjin University of Science & Technology. Jun. 2018;33(3):40-45.

(Continued)

*Primary Examiner* — Leigh C Maier
*Assistant Examiner* — Everett White
(74) *Attorney, Agent, or Firm* — McCarter & English, LLP; Steven G. Davis; Wei Song

(57) ABSTRACT

Carboxymethylated cellulose nanofibers in which the cellulose type I crystallinity is 60% or higher, the aspect ratio is 350 or lower, and the transmittance of light having a wavelength of 660 nm when the carboxymethylated cellulose nanofibers are made into an aqueous dispersion having a solids fraction of 1% (w/v) is 60% or higher.

8 Claims, No Drawings

(56) References Cited

FOREIGN PATENT DOCUMENTS

| WO | 2019/111933 A1 | 6/2019 |
| WO | 2019/111934 A1 | 6/2019 |
| WO | 2019/111939 A1 | 6/2019 |

OTHER PUBLICATIONS

Liu et al., Preparation of Bamboo Nanofibrillated Cellulose with Carboxyl Groups by TEMPO-Mediated Oxidation. Journal of Cellulose Science and Technology. Sep. 2016;24(3):59-66.
U.S. Appl. No. 16/768,939, filed Jun. 2, 2020, 2021-0214465, Published.
U.S. Appl. No. 16/768,945, filed Jun. 2, 2020, 2021-0214466, Published.
U.S. Appl. No. 16/769,836, filed Jun. 4, 2020, 2020-0369787, Published.
U.S. Appl. No. 16/769,666, filed Jun. 4, 2020, 2021-0180214, Published.
Zhu et al., The Effect of Refining and Carboxymethyl Treatment on Morphology and Crystal Structure of Sugarcane Bagasse Fibers. Sugarcane and Canesugar Oct. 2015;5:51-57.

\* cited by examiner

CARBOXYMETHYLATED CELLULOSE NANOFIBERS

CROSS-REFERENCE TO RELATED APPLICATIONS

This application is a U.S. national stage filing, under 35 U.S.C. § 371(c), of International Application No. PCT/JP2018/044702, filed on Dec. 5, 2018, which claims priority to Japanese Patent Application No. 2017-235016, filed on Dec. 7, 2017, Japanese Patent Application No. 2018-007508, Jan. 19, 2018, Japanese Patent Application No. 2018-028561, filed Feb. 21, 2018, and Japanese Patent Application No. 2018-076540, filed Apr. 12, 2018. The entire contents of each of the aforementioned applications are incorporated herein by reference.

TECHNICAL FIELD

The present invention relates to a carboxymethylated cellulose nanofiber. Specifically, the present invention relates to a carboxymethylated cellulose nanofiber which exhibits a high transparency when dispersed in water to form a water dispersion and is high in degree of crystallization of cellulose I type and low in aspect ratio.

BACKGROUND ART

Carboxymethylated celluloses are cellulose derivatives, and are obtained by linking carboxymethyl groups to some of hydroxyl groups in glucose residues constituting cellulose backbones to form ether linkages. Increase in the amount of carboxymethyl groups (namely, increase in the degree of carboxymethyl substitution) allows carboxymethylated celluloses to be dissolved in water. On the other hand, adjusting the degree of carboxymethyl substitution to a proper range allows carboxymethylated celluloses to maintain fibrous shapes in water. A carboxymethylated cellulose having a fibrous shape can be mechanically defibrated and thus converted into a nanofiber having a nanoscale fiber diameter (PTL 1).

A commonly known method for producing carboxymethylated cellulose is a method including subjecting cellulose to an alkaline treatment (mercerization) and then a treatment with an etherifying agent (also referred to as "carboxymethylation agent") (carboxymethylation, also called "etherification"). In the method, there are two known processes, one of which includes performing both mercerization and carboxymethylation by using water as a solvent and another of which includes performing both mercerization and carboxymethylation in an organic solvent or a mixed solvent of an organic solvent and water (PTL 2), and the former is called "water mediated method" and the latter is called "solvent mediated method".

A known method for producing a cellulose nanofiber having a nanoscale fiber diameter is, for example, not only mechanical defibration of carboxymethylated cellulose, but also mechanical defibration of a cellulose having carboxyl groups introduced therein (PTL 3).

CITATION LIST

Patent Literature

PTL 1: International Publication No. WO 2014/088072
PTL 2: Japanese Patent Laid-Open No. 2017-149901
PTL 3: Japanese Patent Laid-Open No. 2008-1728

SUMMARY OF INVENTION

Technical Problem

A water dispersion of a cellulose nanofiber obtained by defibration of cellulose having carboxyl groups introduced therein, as described in PTL 3, is known to be high in transparency. On the other hand, a water dispersion of a cellulose nanofiber obtained by defibration of a carboxymethylated cellulose obtained by a solvent mediated method is low in transparency as compared with a water dispersion of a cellulose nanofiber obtained by defibration of a cellulose having carboxyl groups introduced therein. For obtaining a water dispersion of a cellulose nanofiber with enhanced transparency by defibration of a carboxymethylated cellulose obtained by a water mediated method, a large amount of chemical agents such as a mercerizing agent and/or a carboxymethylation agent is needed, which has large problems with production and economy. Transparent materials are suitable for various applications and therefore it is demanded that cellulose nanofibers be transparent. In particular, carboxymethylated celluloses are materials high in safety and thus it is demanded to obtain a cellulose nanofiber high in transparency by use of carboxymethylated cellulose. An object of the present invention is to provide a carboxymethylated cellulose nanofiber which can be used to form a water dispersion high in transparency and has novel characteristics.

Solution to Problem

The present inventors have made intensive studies to achieve the above object, and as a result, have found that when mercerization (alkaline treatment of cellulose) in a solvent containing mainly water is followed by carboxymethylation (also referred to as "etherification") in a mixed solvent of water and an organic solvent, in carboxymethylation of cellulose, a carboxymethylated cellulose which can be defibrated to form a cellulose nanofiber dispersion very high in transparency can be produced at a high rate of effective utilization of a carboxymethylation agent in an economic manner, as compared with any carboxymethylated cellulose obtained according to a conventional water mediated method (method including performing both mercerization and carboxymethylation in water as a solvent) or solvent mediated method (method including performing both mercerization and carboxymethylation in a solvent containing mainly an organic solvent). Such a carboxymethylated cellulose nanofiber is a novel carboxymethylated cellulose nanofiber which is high in degree of crystallization of cellulose I type but low in aspect ratio and exhibits a higher transparency than ever before when dispersed in water to form a water dispersion. When the amount of a chemical agent such as a carboxymethylation agent is increased to increase the degree of carboxymethyl substitution in a conventional water mediated method, a carboxymethylated cellulose which can form a nanofiber dispersion high in transparency can be produced; however the carboxymethylated cellulose thus obtained (water mediated method) is characterized by a low degree of crystallization of cellulose I type and a high aspect ratio. On the contrary, a carboxymethylated cellulose obtained by performing mercerization in a solvent containing mainly water and thereafter performing carboxymethylation in a mixed solvent of water and an organic solvent is characterized by not only maintaining a high degree of crystallization of cellulose I type, but also being low in aspect ratio. Such a carboxymethylated cellulose is further characterized by exhibiting very high transparency when dispersed to form a nanofiber dispersion, as compared with any carboxymethylated cellulose produced by a conventional solvent mediated method. Such a carboxymethylated cellulose is also characterized in that though it has a low aspect ratio, the nanofiber dispersion has a high viscosity.

The present invention provides the following, but is not limited thereto.

(1) A carboxymethylated cellulose nanofiber having a degree of crystallization of cellulose I type of 60% or more and an aspect ratio of 350 or less, and exhibiting a transmittance to light at a wavelength of 660 nm of 60% or more when the carboxymethylated cellulose nanofiber is dispersed in water to form a water dispersion having a solid content of 1% (w/v).

(2) The carboxymethylated cellulose nanofiber according to (1), having an average fiber diameter of 3 nm to 500 nm and an aspect ratio of 25 or more and 350 or less.

(3) The carboxymethylated cellulose nanofiber according to (1) or (2), wherein when the carboxymethylated cellulose nanofiber is dispersed in water to form a water dispersion having a solid content of 1% (w/v), the water dispersion has a viscosity (25° C., 60 rpm) of 3000 mPas or more.

(4) The carboxymethylated cellulose nanofiber according to any one of (1) to (3), having a degree of carboxymethyl substitution of 0.60 or less.

(5) The carboxymethylated cellulose nanofiber according to any one of (1) to (4), having a structure in which carboxymethyl groups are linked to hydroxyl groups of cellulose via ether linkages.

Effects of Invention

The present invention provides a carboxymethylated cellulose nanofiber which can be used to form a water dispersion high in transparency. The carboxymethylated cellulose nanofiber of the present invention is characterized by being high in degree of crystallization of cellulose I type (60% or more) and low in aspect ratio (350 or less). When a degree of crystallization of cellulose I type is high, the proportion of cellulose which maintains a crystal structure without dissolution in a solvent such as water is high, and this brings about advantages that such a nanofiber can impart high thixotropic properties and therefore is suitable for an application in viscosity modification such as a thickener, and also that such a nanofiber enhances ability to retain a shape of a gel-like substance (foods, medicines, and/or the like) when added thereto. Due to a low aspect ratio, the fiber length is not too long and fiber entwining is thus decreased, thereby enabling the occurrence of an aggregate (clump) of the cellulose nanofiber to be reduced. Accordingly, the carboxymethylated cellulose nanofiber is suitable for an application which requires transparency and few aggregate (for example, but not limited to, foods and/or cosmetics). In addition, a low aspect ratio results in favorable fluidity, and this brings about the advantages of ease of use even at a high concentration and ease of use even in an application in which a high solid content is demanded. The carboxymethylated cellulose nanofiber is also characterized by being high in viscosity but low in aspect ratio, and this brings about an advantage that a high thickening effect is obtained while the occurrence of an aggregate (clump) is reduced.

DESCRIPTION OF EMBODIMENTS

<Carboxymethylated Cellulose Nanofiber>

The present invention relates to a carboxymethylated cellulose nanofiber. A carboxymethylated cellulose has a structure formed by linking carboxymethyl groups to some of hydroxyl groups in glucose residues constituting cellulose to form ether linkages.

The carboxymethylated cellulose nanofiber refers to a product obtained by converting the carboxymethylated cellulose having the above structure into a nanofiber having a nanoscale fiber diameter. The carboxymethylated cellulose may be in the form of a salt including a metal salt such as a carboxymethylated cellulose sodium salt, and the carboxymethylated cellulose nanofiber may also be in the form of a salt.

The carboxymethylated cellulose nanofiber of the present invention maintains at least a portion of a fibrous shape, even when dispersed in water. Specifically, the carboxymethylated cellulose nanofiber of the present invention is such that a fibrous substance is found in observation of a water dispersion of the carboxymethylated cellulose nanofiber with an electron microscope. A peak of a cellulose I type crystal is also exhibited in observation of the carboxymethylated cellulose nanofiber with X-ray diffraction.

<Degree of Crystallization of Cellulose I Type>

The degree of crystallization of cellulose in the carboxymethylated cellulose nanofiber of the present invention is 60% or more, preferably 65% or more, with respect to crystal I type. In a case where the degree of crystallization of cellulose I type is 60% or more, the proportion of cellulose which maintains a crystal structure without dissolution in a solvent such as water is high. Thus, such a carboxymethylated cellulose nanofiber exhibits enhanced thixotropic properties (thixotropy), and therefore is suitable for an application in viscosity modification such as a thickener. Moreover, for example, this brings about an advantage that such a nanofiber can impart an excellent ability to retain a shape to, for example, but is not limited thereto, a gel-like substance (for example, foods and/or cosmetics) when added thereto. The crystallinity of cellulose can be controlled by the concentration of a mercerizing agent and the temperature in treatment, as well as the degree of carboxymethylation. An alkali at a high concentration is used in mercerization and carboxymethylation to thereby allow a I type crystal of cellulose to be easily converted into a II type crystal; however, for example, the amount of the alkali (mercerizing agent) used can be adjusted to adjust the degree of denaturation, thereby allowing desired crystallinity to be maintained. The upper limit of the degree of crystallization of cellulose I type is not particularly limited. The upper limit is considered to be actually about 90%.

The method for measuring the degree of crystallization of cellulose I type of the carboxymethylated cellulose nanofiber is as follows:

A sample is placed on a glass cell, and subjected to measurement with an X-ray diffractometer (LabX XRD-6000, manufactured by Shimadzu Corporation). The degree of crystallization is calculated according to a procedure of Segal, et al., and is calculated from the diffraction intensity of the 002 plane at $2\theta=22.6°$ and the diffraction intensity of an amorphous portion at $2\theta=18.5°$ with the diffraction intensity at $2\theta=10°$ to $30°$ as the baseline in an X-ray diffraction diagram, according to the following expressions.

$Xc=(I002c-Ia)/I002c\times100$ $Xc$=degree (%) of crystallization of cellulose $I$ type $I002c$: diffraction intensity of 002 plane at $2\theta=22.6°$
$Ia$: diffraction intensity of amorphous portion at $2\theta=18.5°$.

The proportion of the I type crystal of the carboxymethylated cellulose nanofiber is generally the same as that of the carboxymethylated cellulose before formation of the nanofiber.

<Fiber Diameter and Aspect Ratio>

The carboxymethylated cellulose nanofiber of the present invention has a nanoscale fiber diameter. The average fiber diameter is preferably 3 nm to 500 nm, further preferably 3 nm to 150 nm, further preferably 3 nm to 20 nm, further preferably 5 nm to 19 nm, further preferably 5 nm to 15 nm. The aspect ratio of the carboxymethylated cellulose nanofiber of the present invention is 350 or less, preferably 300 or less, further preferably less than 200, further preferably less than 120. In a case where the aspect ratio is 350 or less, the fiber length is not too long and fiber entwining is thus decreased, thereby enabling the occurrence of an aggregate (clump) of the cellulose nanofiber to be reduced. A high fluidity is also achieved, and this brings about the advantages of ease of use even at a high concentration and ease of use even in an application in which a high solid content is demanded. The lower limit of the aspect ratio is not particularly limited, and is preferably 25 or more, further preferably 30 or more. In a case where the aspect ratio is 25 or more, the fibrous shape imparts the effect of enhancing thixotropic properties. The carboxymethylated cellulose nanofiber of the present invention is characterized by not only having a high degree of crystallization, for example, a degree of crystallization of cellulose I type of 60% or more, but also having an aspect ratio of 350 or less. The carboxymethylated cellulose nanofiber having such degree of crystallization of cellulose I type and aspect ratio can be produced by a method described below. The aspect ratio can be controlled by the mixing ratio between a solvent and water, the amount of chemical agents added, and the degree of carboxymethylation, in carboxymethylation.

The average fiber diameter and the average fiber length of the carboxymethylated cellulose nanofiber can be each determined by analyzing 200 fibers randomly selected, with an atomic force microscope (AFM) in the case of a diameter of 20 nm or less or with a field emission scanning electron microscope (FE-SEM) in the case of a diameter of 20 nm or more, and calculating the average. The aspect ratio can be calculated according to the following expression:

Aspect ratio=Average fiber length/Average fiber diameter.

<Transparency in Water Dispersion>

The carboxymethylated cellulose nanofiber of the present invention is characterized by exhibiting a high transparency when dispersed in water as a dispersing medium to form a dispersion (water dispersion). The transparency herein refers to the transmittance to light at a wavelength of 660 nm when the carboxymethylated cellulose nanofiber is dispersed in water to form a water dispersion having a solid content of 1% (w/v). The method for measuring the transparency of the carboxymethylated cellulose nanofiber is as follows:

A cellulose nanofiber dispersion (solid content: 1% (w/v), dispersing medium: water) is prepared, and the transparency to light at 660 nm is measured with a square cell having a length of light path of 10 mm and UV-VIS spectrophotometer UV-1800 (manufactured by Shimadzu Corporation).

The transparency of the carboxymethylated cellulose nanofiber of the present invention is 60% or more, more preferably 70% or more, further preferably 80% or more, further preferably 90% or more. The upper limit of the transparency is not particularly limited, and is, for example, 100%. Such a cellulose nanofiber can be optimally used in an application which requires transparency.

<Viscosity in Water Dispersion>

When the carboxymethylated cellulose nanofiber of the present invention is dispersed in water as a dispersing medium to form a dispersion (water dispersion), the dispersion preferably has a viscosity (25° C., 60 rpm) of 3000 mPas or more. The upper limit is not particularly limited, and is considered to be about 7000 mPas. A carboxymethylated cellulose nanofiber having a high viscosity but having a low aspect ratio is hardly formed into an aggregate (clump) even in use at a high concentration, and thus has the advantage of the ability to impart a high thickening effect. The method for measuring the viscosity of the carboxymethylated cellulose nanofiber is as follows:

A cellulose nanofiber dispersion (solid content: 1% (w/v), dispersing medium: water) is prepared and left to still stand at 25° C. for 16 hours. Thereafter, the dispersion is stirred using a stirring machine at 3000 rpm for 1 minute, and the viscosity was measured with a No. 4 rotor at a rotational speed of 60 rpm after 3 minutes by use of a B-type viscometer (manufactured by Toki Sangyo Co., Ltd.).

<Degree of Carboxymethyl Substitution>

The carboxymethylated cellulose nanofiber of the present invention preferably has a degree of carboxymethyl substitution per anhydrous glucose unit of cellulose of 0.60 or less. In a case where the degree of substitution is more than 0.60, it is considered that dissolution in water occurs to fail to maintain a fibrous form. The degree of substitution is preferably 0.02 to 0.50, further preferably 0.05 to 0.50, further preferably 0.10 to 0.40, further preferably 0.20 to 0.40 in consideration of operationability. By introducing carboxymethyl groups into celluloses, electrical repulsion of the celluloses occurs, and thus the resulting celluloses can be defibrated to nanofibers; however, when the degree of carboxymethyl substitution per anhydrous glucose unit is less than 0.02, defibration may be insufficient and thus a cellulose nanofiber high in transparency may not be obtained. It has been difficult particularly in a degree of carboxymethyl substitution ranging from 0.20 to 0.40 to obtain a carboxymethylated cellulose nanofiber having a degree of crystallization of cellulose I type of 60% or more, according to a conventional water mediated method; however, the present inventors have found that, for example, a production method described below can produce a carboxymethylated cellulose nanofiber having a degree of carboxymethyl substitution in the range from 0.20 to 0.40, a degree of crystallization of cellulose I type of 60% or more, and an aspect ratio of 350 or less. The degree of carboxymethyl substitution can be adjusted by, for example, controlling the amount of a carboxymethylation agent to be added in a reaction, the amount of a mercerizing agent, and the compositional ratio between water and an organic solvent.

The anhydrous glucose unit in the present invention means individual anhydrous glucose (glucose residue) constituting cellulose. The degree of carboxymethyl substitution (also referred to as "degree of etherification") herein represents the proportion of hydroxyl groups replaced with carboxymethyl ether groups among hydroxyl groups of the glucose residue constituting cellulose (the number of carboxymethyl ether groups per glucose residue). The degree of carboxymethyl substitution may be here abbreviated as DS.

The method for measuring the degree of carboxymethyl substitution is as follows:

About 2.0 g of a sample is precisely weighed and is put in a 300-mL stoppered conical flask. 100 mL of a liquid obtained by adding 100 mL of nitric acid (special grade) to 1000 mL of nitric acid/methanol is added thereto and the resulting flask is shaken for 3 hours, thereby converting the salt of the carboxymethylated cellulose nanofiber (CMC) into H-CMC (hydrogen-type carboxymethylated cellulose nanofiber). 1.5 to 2.0 g of the absolute dry H-CMC is precisely weighed, and is put in a 300-mL stoppered conical flask. The H-CMC is wetted with 15 mL of 80% methanol. 100 mL of 0.1 N—NaOH is added thereto, and the resulting flask is shaken at room temperature for 3 hours. Phenolphthalein is used as an indicator to reversely titrate excess NaOH by 0.1 N—$H_2SO_4$, and the degree of carboxymethyl substitution (DS value) is calculated according to the following expressions.

$$A=[(100-F'-0.1N\text{—}H_2SO_4(mL)\times F)\times 0.1]/(\text{Absolute dry mass (g) of H—CMC})$$

$$\text{Degree of carboxymethyl substitution}=0.162\times A/(1-0.058\times A)$$

F': factor of 0.1 N—$H_2SO_4$
F: factor of 0.1 N—NaOH.

The degree of carboxymethyl substitution of the carboxymethylated cellulose nanofiber is generally the same as the degree of carboxymethyl substitution of the carboxymethylated cellulose before formation of the nanofiber.

<Others>

The carboxymethylated cellulose nanofiber may be in the state of a dispersion obtained after production, or may be, if necessary, dried, and re-dispersed in water. The drying method is not limited, and for example, any known method such as a freeze-drying method, a spray-drying method, a shelf-type drying method, a drum drying method, a belt drying method, a drying method including thinly extending on a glass plate or the like, a fluid-bed drying method, a microwave drying method, or a drying method including using heat generating fan under reduced pressure can be used. After drying, the resultant may be, if necessary, pulverized by a cutter mill, a hammer mill, a pin mill, a jet mill, or the like. The method for re-dispersing in water is also not particularly limited, and any known dispersing apparatus can be used.

The application of the carboxymethylated cellulose nanofiber is not particularly limited, and the carboxymethylated cellulose nanofiber of the present invention, which has an aspect ratio of 350 or less, a degree of crystallization of cellulose I type of 60% or more, and a transparency of 60% or more, is excellent in not only fluidity and the thickening properties, but also transparency, and it is considered that such a carboxymethylated cellulose nanofiber can be used particularly optimally in an application in which such properties are required (for example, a thickener having no effects on transparency and color tone of a composition). The carboxymethylated cellulose nanofiber, however, may be used in any application other than the above. The carboxymethylated cellulose nanofiber is not particularly limited in terms of the field thereof to be used. It is considered that the carboxymethylated cellulose nanofiber can be used as a thickener, a gelling agent, a pasting agent, a food additive, an excipient, an additive for paints, an additive for adhesives, an additive for papermaking, a polishing agent, a compounding material for rubber or plastics, a water retention agent, a shape retention agent, a mud adjuster, a filtration aid, a mud overflow inhibitor, or the like in various fields in which an additive is generally used, for example, foods, beverages, cosmetics, medicines, papermaking, various chemical goods, paints, spray, agricultural chemicals, civil engineering, architecture, electronic materials, flame retardants, household products, adhesives, detergents, aromatic substances, and lubricant compositions.

<Method for Producing Carboxymethylated Cellulose Nanofiber>

The carboxymethylated cellulose nanofiber having a degree of crystallization of cellulose I type of 60% or more, an aspect ratio of 350 or less, and a transmittance to light at a wavelength of 660 nm of 60% or more when dispersed in water to form a water dispersion having a solid content of 1% (w/v) can be produced by, for example, but not limited to, defibration of a carboxymethylated cellulose obtained according to the following method.

Carboxymethylated celluloses can be commonly produced by subjecting cellulose to an alkaline treatment (mercerization), and thereafter allowing the resulting mercerized cellulose (also referred to as "alkaline cellulose") to react with a carboxymethylation agent (also referred to as "etherifying agent"). A carboxymethylated cellulose which can form the nanofiber having the above characteristics of the present invention can be produced by performing mercerization (alkaline treatment of cellulose) in a solvent containing mainly water and thereafter performing carboxymethylation (also referred to as "etherification") in a mixed solvent of water and an organic solvent. The carboxymethylated cellulose thus obtained can be converted into a cellulose nanofiber dispersion high in transparency and low in aspect ratio by defibration while having achieved a high rate of effective utilization of a carboxymethylation agent, as compared with any carboxymethylated cellulose obtained according to a conventional water mediated method (method including performing both mercerization and carboxymethylation in water as a solvent) or solvent mediated method (method including performing both mercerization and carboxymethylation in a solvent containing mainly an organic solvent).

<Cellulose>

The cellulose in the present invention means polysaccharide having a structure in which D-glucopyranoses (D-glucopyranose is also simply referred to as "glucose residue" or "anhydrous glucose") are connected by β-1,4 linkages. Celluloses are commonly classified to, for example, native cellulose, regenerated cellulose, fine cellulose, and microcrystalline cellulose, from which an amorphous region is removed, depending on the source, the production method, and the like. Any of such celluloses can be used as a raw material of the mercerized cellulose in the present invention, and cellulose high in degree of crystallization of cellulose I type is preferably used as a raw material in order that a degree of crystallization of cellulose I type of 60% or more is maintained in the carboxymethylated cellulose nanofiber. The degree of crystallization of cellulose I type of the cellulose as a raw material is preferably 70% or more, further preferably 80% or more. The method for measuring the degree of crystallization of cellulose I type is as described above.

Examples of the native cellulose include bleached pulp and unbleached pulp (bleached wood pulp or unbleached wood pulp); linter and refined linter; and cellulose produced by microorganisms such as acetic acid bacteria. The raw material of the bleached pulp or unbleached pulp is not limited, and examples thereof include wood, cotton, straw, bamboo, hemp, jute, and kenaf. The method for producing the bleached pulp or unbleached pulp is also not particularly limited, and may be a mechanical method, a chemical method, or a combined intermediate method between these two methods. Examples of the bleached pulp or unbleached pulp classified according to the production method include mechanical pulp (thermomechanical pulp (TMP), groundwood pulp), chemical pulp (sulfite pulp such as needle (softwood) unbleached sulfite pulp (NUSP), and needle bleached sulfite pulp (NBSP), and kraft pulp such as needle unbleached kraft pulp (NUKP), needle bleached kraft pulp (NBKP), leaf (hardwood) unbleached kraft pulp (LUKP), and leaf bleached kraft pulp (LBKP)). Dissolving pulp may also be used, besides papermaking pulp. Dissolving pulp is pulp chemically refined, is mainly used in a dissolved state in chemicals, and serves as a main raw material of an artificial fiber, cellophane, or the like.

Examples of the regenerated cellulose include one obtained by dissolving cellulose in a solvent such as a cuprammonium solution, a cellulose xanthate solution, or a morpholine derivative, and anew subjecting the resultant to spinning. Examples of the fine cellulose include one obtained by subjecting a cellulose material such as the native cellulose or regenerated cellulose to a depolymerization treatment (for example, acid hydrolysis, alkali hydrolysis, enzymatic degradation, a blasting treatment, or a vibration ball mill treatment), and one obtained by mechanically treating the cellulose-based material.

<Mercerization>

The mercerized cellulose (also referred to as "alkaline cellulose") is obtained by using the above cellulose as a raw material and adding a mercerizing agent (alkali) thereto. A carboxymethylated cellulose which can be defibrated to form a cellulose nanofiber dispersion very high in transparency can be obtained in an economic manner by using mainly water as a solvent for a mercerization reaction and a mixed solvent of an organic solvent and water for the next carboxymethylation, according to the method described herein.

"Using mainly water as a solvent (solvent containing mainly water)" refers to using a solvent containing water in an amount of higher than 50% by mass. The solvent containing mainly water preferably contains 55% by mass or more, more preferably 60% by mass or more, more preferably 70% by mass or more, more preferably 80% by mass or more, further preferably 90% by mass or more, further preferably 95% by mass or more of water. The solvent containing mainly water particularly preferably contains 100% by mass of water (namely, is water). As the proportion of water in mercerization is higher, the transparency of a cellulose nanofiber dispersion obtained by defibrating the carboxymethylated cellulose is higher. Examples of the solvent (which is mixed with water when use) other than water in the solvent containing mainly water include an organic solvent used as a solvent for carboxymethylation of the later stage. Examples can include alcohols such as methanol, ethanol, n-propyl alcohol, isopropyl alcohol, n-butanol, isobutanol, and tert-butanol, ketones such as acetone, diethyl ketone, and methyl ethyl ketone, and dioxane, diethyl ether, benzene and dichloromethane. These can be used singly or in the form of a mixture of two or more thereof, and be added to water in an amount of less than 50% by mass, as a solvent for mercerization. The solvent containing mainly water preferably contains 45% by mass or less, further preferably 40% by mass or less, further preferably 30% by mass or less, further preferably 20% by mass or less, further preferably 10% by mass or less, further preferably 5% by mass or less, more preferably 0% by mass of the organic solvent.

Examples of the mercerizing agent include alkali metal hydroxides such as lithium hydroxide, sodium hydroxide, and potassium hydroxide, and these can be used singly or in combinations of any two or more thereof. The mercerizing agent is not limited thereto, but such an alkali metal hydroxide can be added to a reactor, for example, in the form of an aqueous solution having a content of the alkali metal hydroxide of 1 to 60% by mass, preferably 2 to 45% by mass, more preferably 3 to 25% by mass.

The amount of the mercerizing agent used is an amount such that the carboxymethylated cellulose can maintain a degree of crystallization of cellulose I type of 60% or more, and, in one embodiment, the amount thereof per 100 g of cellulose (absolute dry) is preferably 0.1 mol or more and 2.5 mol or less, more preferably 0.3 mol or more and 2.0 mol or less, further preferably 0.4 mol or more and 1.5 mol or less.

The amount of the solvent containing mainly water for mercerization may be any amount as long as a raw material can be stirred and mixed, and is not particularly limited, and the amount thereof is preferably 1.5 to 20 times, more preferably 2 to 10 times as large as that of cellulose as a raw material, in terms of mass.

A mercerization treatment is performed by mixing a starting raw material (cellulose) and the solvent containing mainly water, adjusting the temperature of a reactor to 0 to 70° C., preferably 10 to 60° C., more preferably 10 to 40° C., adding an aqueous solution of a mercerizing agent, and stirring the resultant for 15 minutes to 8 hours, preferably 30 minutes to 7 hours, more preferably 30 minutes to 3 hours. Thus, the mercerized cellulose (alkaline cellulose) is obtained.

The pH for mercerization is preferably 9 or more, and thus the mercerization reaction can progress. The pH is more preferably 11 or more, further preferably 12 or more, and may be 13 or more. The upper limit of the pH is not particularly limited.

Such mercerization can be performed by use of a reactor in which the above respective components can be mixed and stirred while controlling the temperature, and any of various reactor conventionally used for a mercerization reaction can be used. For example, a batch type stirred reactor in which two screws are used to stir and mix the components is preferable in view of uniform mixing ability and also productivity.

<Carboxymethylation>

The carboxymethylated cellulose is obtained by adding a carboxymethylation agent (also referred to as "etherifying agent") to the mercerized cellulose. A carboxymethylated cellulose which can be defibrated to form a cellulose nanofiber dispersion very high in transparency can be obtained in an economic manner by use of a solvent containing mainly water for mercerization and a mixed solvent of water and an organic solvent for carboxymethylation, according to the method described herein Examples of the carboxymethylation agent include monochloroacetic acid, sodium monochloroacetate, methyl monochloroacetate, ethyl monochloroacetate, and isopropyl monochloroacetate. In particular, monochloroacetic acid or sodium monochloroacetate is preferable in terms of their availability.

The amount of the carboxymethylation agent used is an amount such that a degree of crystallization of cellulose I type of 60% or more can be maintained, preferably an amount such that a degree of carboxymethyl substitution of 0.20 to 0.40 can be maintained. The amount is not particularly limited, and, in one embodiment, the carboxymethylation agent is preferably added in an amount ranging from 0.5 to 1.5 mol per anhydrous glucose unit of cellulose. The lower limit of the range is more preferably 0.6 mol or more, further preferably 0.7 mol or more, and the upper limit in the range is more preferably 1.3 mol or less, further preferably 1.1 mol or less. The carboxymethylation agent can be added to a reactor, for example, but not limited to, in the form of an aqueous solution having a content of the carboxymethylation agent of 5 to 80% by mass, more preferably 30 to 60% by mass, and can also be added in the form of a powder without any dissolution.

The molar ratio of the mercerizing agent to the carboxymethylation agent (mercerizing agent/carboxymethylation agent) generally adopted is 0.90 to 2.45 in a case where monochloroacetic acid or sodium monochloroacetate is used as the carboxymethylation agent. The reason for this is as follows: a molar ratio of less than 0.90 can cause a carboxymethylation reaction to insufficiently progress, resulting in remaining of the unreacted monochloroacetic acid or sodium monochloroacetate and thus diseconomy, and a molar ratio of more than 2.45 may cause a side reaction of an excess of the mercerizing agent with monochloroacetic acid or sodium monochloroacetate to progress, resulting in production of a glycolic acid alkali metal salt and thus diseconomy.

The rate of effective utilization of the carboxymethylation agent in carboxymethylation is preferably 15% or more, more preferably 20% or more, further preferably 25% or more, particularly preferably 30% or more. The rate of effective utilization of the carboxymethylation agent refers to the proportion of carboxymethyl groups introduced into cellulose to carboxymethyl groups in the carboxymethylation agent. A carboxymethylated cellulose which can be defibrated to form a cellulose nanofiber dispersion high in transparency can be produced, at a high rate of effective utilization of the carboxymethylation agent (namely, in an economic manner without use of a large amount of the carboxymethylation agent), by use of a solvent containing mainly water for mercerization and a mixed solvent of water and an organic solvent for carboxymethylation. The upper limit of the rate of effective utilization of the carboxymethylation agent is not particularly limited, and the upper limit is actually about 80%. The rate of effective utilization of the carboxymethylation agent may be herein abbreviated as AM.

The method for calculating the rate of effective utilization of the carboxymethylation agent is as follows:

$$AM=(DS \times \text{Number of moles of cellulose})/\text{Number of moles of carboxymethylation agent}$$

DS: Degree of carboxymethyl substitution (The measurement method is as described above) Number of moles of cellulose: Mass of pulp (Dry mass after drying at 100° C. for 60 minutes)/162
(162 means the molecular weight per glucose unit of cellulose).

The concentration of the raw material of cellulose in the carboxymethylation reaction is not particularly limited, and is preferably 1 to 40% (w/v) in view of an enhancement in rate of effective utilization of the carboxymethylation agent.

The carboxymethylation reaction is allowed to progress in a mixed solvent of water and an organic solvent, the mixed solvent being formed by appropriately adding an organic solvent or an aqueous solution of an organic solvent to the reactor, or alternatively, appropriately reducing the organic solvent other than water for the mercerization treatment, for example, under reduced pressure, at the same time as of addition of the carboxymethylation agent or before or immediately after addition of the carboxymethylation agent, to thereby form the mixed solvent of water and an organic solvent. The timing of addition or reduction of the organic solvent is not particularly limited as long as it is within the time from completion of the mercerization reaction to immediately after addition of the carboxymethylation agent, and is preferably, for example, within 30 minutes before or after addition of the carboxymethylation agent.

Examples of the organic solvent include alcohols such as methanol, ethanol, n-propyl alcohol, isopropyl alcohol, n-butanol, isobutanol, and tert-butanol, ketones such as acetone, diethyl ketone, and methyl ethyl ketone, and dioxane, diethyl ether, benzene and dichloromethane. These can be used singly or in the form of a mixture of two or more thereof, and be added to water as a solvent for carboxymethylation. In particular, a monohydric alcohol having 1 to 4 carbon atoms is preferable, and a monohydric alcohol having 1 to 3 carbon atoms is further preferable, because compatibility with water is excellent.

The content of the organic solvent in the mixed solvent for carboxymethylation is preferably 20% by mass or more, more preferably 30% by mass or more, further preferably 40% by mass or more, further preferably 45% by mass or more, particularly preferably 50% by mass or more based on the total of water and the organic solvent. A higher content of the organic solvent brings about the advantage of a higher transparency of the cellulose nanofiber dispersion to be formed. The upper limit of the content of the organic solvent is not limited, and may be, for example, 99% by mass or less. The upper limit is preferably 90% by mass or less, further preferably 85% by mass or less, further preferably 80% by mass or less, further preferably 70% by mass or less in consideration of the cost of the organic solvent added.

The reaction medium (the mixed solvent of water and the organic solvent, containing no cellulose) for carboxymethylation preferably has a lower water content (in other words, a higher organic solvent content) than the reaction medium for mercerization. When the above range is satisfied, the degree of crystallization of the resulting carboxymethylated cellulose can be easily maintained while the degree of carboxymethyl substitution is also easily increased, and thus a carboxymethylated cellulose which can be defibrated to form a cellulose nanofiber dispersion high in transparency can be more efficiently obtained. In a case where the reaction medium for carboxymethylation has a lower water content (a higher organic solvent content) than the reaction medium for mercerization, the mixed solvent for the carboxymethylation reaction can be advantageously formed by a simple procedure in which a desired amount of the organic solvent is added to the reaction system after completion of the mercerization reaction, in transferring from the mercerization reaction to the carboxymethylation reaction.

The mixed solvent of water and an organic solvent is thus formed, the carboxymethylation agent is added to the mercerized cellulose, and then the resultant is stirred for about 15 minutes to 4 hours, preferably about 15 minutes to 1 hour while the temperature is preferably kept constantly in the range from 10 to 40° C. Mixing of a liquid containing the mercerized cellulose with the carboxymethylation agent is preferably performed by adding the carboxymethylation agent in portions or dropwise, in view of preventing the reaction mixture from being at a high temperature. After the carboxymethylation agent is added, the resulting mixture was stirred for a certain time, and the temperature thereof is, if necessary, raised. An etherification (carboxymethylation) reaction is then performed at a reaction temperature of 30 to 90° C., preferably 40 to 90° C., further preferably 60 to 80° C. for 30 minutes to 10 hours, preferably 1 hour to 4 hours, thereby obtaining the carboxymethylated cellulose.

The reactor which has been used for mercerization may be used as it is, or another reactor in which the components can be mixed and stirred while controlling the temperature may be used, for carboxymethylation.

After completion of the reaction, the remaining alkali metal salt may be neutralized with a mineral acid or organic acid. If necessary, an inorganic salt, an organic acid salt, and others as by-product(s) may be removed by washing with water-containing methanol, and the resultant may be dried, pulverized and classified to form the carboxymethylated cellulose or the salt thereof. For removal of by-product(s), the carboxymethylated cellulose may be converted into an acid form before the washing, and the acid form may be returned to a salt form after the washing. Examples of an apparatus for use in dry pulverization include impact mills such as a hammer mill and a pin mill, medium mills such as a ball mill and a tower mill, and jet mills. Examples of an apparatus for use in wet pulverization include apparatuses such as a homogenizer, a masscolloider, and a pearl mill.

<Defibration into Nanofiber>

A carboxymethylated cellulose obtained by the above method can be converted by defibration into a cellulose nanofiber having a nanoscale fiber diameter.

Before defibration, a dispersion of the carboxymethylated cellulose obtained by the above method is prepared. A dispersing medium is preferably water in terms of ease of handling. The concentration of the carboxymethylated cellulose in the dispersion in defibration is preferably 0.01 to 10% (w/v) in consideration of defibration and dispersing efficiencies.

The apparatus for use in defibration of the carboxymethylated cellulose is not particularly limited, and, for example, a high-speed rotation type, colloide mill type, high pressure type, roll mill type, or ultrasound type apparatus can be used. It is preferable to apply a strong shear force to the dispersion of the carboxymethylated cellulose in defibration. Particularly, it is preferable for efficient defibration to use a wet high-pressure or ultra-high-pressure homogenizer which can apply a pressure of 50 MPa or more to the dispersion and can apply a strong shear force. The pressure is more preferably 100 MPa or more, further preferably 140 MPa or more. The dispersion may be subjected to, if necessary, a pre-treatment with known mixing, stirring, emulsifying, and/or dispersing apparatus(es), such as a high-speed shear mixer, prior to a defibration and dispersing treatment by a high-pressure homogenizer.

The high-pressure homogenizer is an apparatus which performs emulsifying, dispersing, defibrating, pulverizing, and ultra-fining with total energy of particle collision, a shear force due to the difference in pressure, and the like by subjecting a fluid to pressurizing (high pressure) by a pump and thus ejecting the fluid through a very fine gap provided in a passage.

While the reason why the above method can provide a cellulose nanofiber high in transparency in an economic manner is not clear, the present inventors have confirmed that the above method enables maintaining a high degree of crystallization of cellulose I type and therefore enables maintaining a fibrous shape of the carboxymethylated cellulose even at a higher degree of carboxymethyl substitution. It is considered that a high degree of carboxymethyl substitution (namely, introduction of many carboxylmethyl groups) with the fibrous shape being maintained leads to an enhancement in defibrating properties of carboxymethylated cellulose, and this is probably one reason why a nanofiber dispersion high in transparency is obtained. However, reasons other than the above are not excluded.

EXAMPLES

Hereinafter, the present invention will be more specifically described with reference to Examples and Comparative Examples, but the present invention is not intended to be limited thereto. Unless particularly noted, "part(s)" and "%" represent "part(s) by mass" and "% by mass".

Example 1

To a twin-screw kneader whose rotational speed was modulated to 150 rpm, were added 130 parts of water and a solution of 20 parts of sodium hydroxide in 100 parts of water, and leaf pulp (LBKP manufactured by Nippon Paper Industries Co., Ltd.) was added thereto in an amount of 100 parts in terms dry mass when dried at 100° C. for 60 minutes. The resultant was stirred and mixed at 35° C. for 80 minutes, to prepare mercerized cellulose. Furthermore, 230 parts of isopropanol (IPA) and 60 parts of sodium monochloroacetate were added thereto while stirring. The resultant was stirred for 30 minutes, and the temperature was raised to 70° C. to allow a carboxymethylation reaction to occur for 90 minutes. The concentration of IPA in a reaction medium in the carboxymethylation reaction was 50%. After completion of the reaction, the resultant was subjected to neutralization to a pH of about 7 with acetic acid, washing with water-containing methanol, liquid removal, and drying, and the resulting dried product was pulverized, thereby obtaining a carboxymethylated cellulose sodium salt.

The resulting carboxymethylated cellulose sodium salt was dispersed in water to form a water dispersion having a solid content of 1% (w/v). The water dispersion was treated by a high-pressure homogenizer at 140 MPa three times, thereby obtaining a carboxymethylated cellulose nanofiber dispersion. The transparency and the viscosity of the resulting dispersion, and the average fiber diameter, the aspect ratio, the degree of carboxymethyl substitution and the degree of crystallization of cellulose I type of the cellulose nanofiber were measured according to the above methods.

Example 2

A carboxymethylated cellulose sodium salt was obtained in the same manner as in Example 1 except that the amount of IPA added was changed to thereby change the concentration of IPA in the reaction liquid in the carboxymethylation reaction to 30%. The resulting carboxymethylated cellulose sodium salt was defibrated in the same manner as in Example 1, thereby obtaining a carboxymethylated cellulose nanofiber dispersion.

Comparative Example 1

A carboxymethylated cellulose sodium salt was obtained in the same manner as in Example 1, except that the solvent for the mercerization reaction contained 10% of water and 90% of IPA and, that a solvent having the same composition was also used in the carboxymethylation reaction. The resulting carboxymethylated cellulose sodium salt was defibrated in the same manner as in Example 1, thereby obtaining a carboxymethylated cellulose nanofiber dispersion.

Comparative Example 2

A carboxymethylated cellulose sodium salt was obtained in the same manner as in Example 1 except the following: needle pulp (NBKP manufactured by Nippon Paper Industries Co., Ltd.) was used in a dry mass of 200 parts instead of the leaf pulp; sodium hydroxide was added in a dry mass of 50 parts; water was added so that the solid content of the pulp was 20% (w/v); no IPA was added in the carboxymethylation reaction; and 50 parts of sodium monochloroacetate (in terms of active component) was added. The resulting carboxymethylated cellulose sodium salt was defibrated in the same manner as in Example 1, thereby obtaining a carboxymethylated cellulose nanofiber dispersion.

TABLE 1

|  | Raw material of cellulose | Average fiber diameter (nm) | Aspect ratio | Degree of carboxymethyl substitution | Degree of crystallization of I type | Transparency (%) | Viscosity (mPa · s) |
| --- | --- | --- | --- | --- | --- | --- | --- |
| Example 1 | LBKP | 3.2 | 60 | 0.31 | 66% | 96.1 | 3320 |
| Example 2 | LBKP | 3.5 | 38 | 0.24 | 73% | 84.4 | 5350 |
| Comparative Example 1 | LBKP | 3.1 | 39 | 0.29 | 66% | 31.5 | 2510 |
| Comparative Example 2 | NBKP | 5.2 | 380 | 0.30 | 58% | 90.5 | 2100 |

It was found as shown in Table 1 that in Examples 1 and 2, in which mercerization and carboxymethylation were performed in the solvent containing mainly water and in the mixed solvent of water and an organic solvent respectively, a carboxymethylated cellulose nanofiber which had a degree of crystallization of cellulose I type of 60% or more, an aspect ratio of 350 or less, and a transparency of 60% or more was produced. On the other hand, it was found that in Comparative Example 1, in which a solvent mediated method as a conventional method was used, transparency was extremely low though the aspect ratio was low with a degree of crystallization of cellulose I type of 60% or more. It was also found that in Comparative Example 2, in which a comparable degree of carboxymethyl substitution to those in Examples 1 and 2 was obtained by a water mediated method as a conventional method, the degree of crystallization of cellulose I type was low and the aspect ratio was significantly high. The carboxymethylated cellulose nanofiber of the present invention, which has a degree of crystallization of cellulose I type of 60% or more, an aspect ratio of 350 or less, and a transparency of 60% or more, is a novel material having unprecedented characteristics, and is expected to be a new option in an application for which a high degree of transparency is demanded, an application for which thixotropic properties are required, and the like.

The invention claimed is:

1. A carboxymethylated cellulose nanofiber having a degree of crystallization of cellulose I type of 60% or more and an aspect ratio of 350 or less, and exhibiting a transmittance to light at a wavelength of 660 nm of 60% or more when the carboxymethylated cellulose nanofiber is dispersed in water to form a water dispersion having a solid content of 1% (w/v); wherein when the carboxymethylated cellulose nanofiber is dispersed in water to form a water dispersion having a solid content of 1% (w/v), the water dispersion has a viscosity (25° C., 60 rpm) of 3000 mPas or more.

2. The carboxymethylated cellulose nanofiber according to claim 1, having an average fiber diameter of 3 nm to 500 nm and an aspect ratio ranging from 25 to 350.

3. The carboxymethylated cellulose nanofiber according to claim 2, having a degree of carboxymethyl substitution of 0.60 or less.

4. The carboxymethylated cellulose nanofiber according to claim 3, having a structure in which carboxymethyl groups are linked to hydroxyl groups of cellulose via ether linkages.

5. The carboxymethylated cellulose nanofiber according to claim 2, having a structure in which carboxymethyl groups are linked to hydroxyl groups of cellulose via ether linkages.

6. The carboxymethylated cellulose nanofiber according to claim 1, having a degree of carboxymethyl substitution of 0.60 or less.

7. The carboxymethylated cellulose nanofiber according to claim 6, having a structure in which carboxymethyl groups are linked to hydroxyl groups of cellulose via ether linkages.

8. The carboxymethylated cellulose nanofiber according to claim 1, having a structure in which carboxymethyl groups are linked to hydroxyl groups of cellulose via ether linkages.

\* \* \* \* \*